(12) United States Patent
Dai et al.

(10) Patent No.: US 11,451,071 B2
(45) Date of Patent: Sep. 20, 2022

(54) BATTERY ELECTRIC VEHICLE ENERGY STORAGE SYSTEM AND METHOD

(71) Applicant: GM GLOBAL TECHNOLOGY OPERATIONS LLC, Detroit, MI (US)

(72) Inventors: Fang Dai, Troy, MI (US); Shifang Li, Shelby Township, MI (US); Jinming Liu, Troy, MI (US); Yue Fan, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 16/890,344

(22) Filed: Jun. 2, 2020

(65) Prior Publication Data

US 2021/0376619 A1 Dec. 2, 2021

(51) Int. Cl.
*H02J 7/00* (2006.01)
*B60L 58/19* (2019.01)

(52) U.S. Cl.
CPC ............ *H02J 7/0024* (2013.01); *B60L 58/19* (2019.02); *H02J 7/0049* (2020.01); *H02J 7/007194* (2020.01)

(58) Field of Classification Search
CPC .. H02J 7/0024; H02J 7/0049; H02J 7/007194; B60L 58/19
USPC ........................................................ 320/117
See application file for complete search history.

(56) References Cited

U.S. PATENT DOCUMENTS

| | | | |
|---|---|---|---|
| 5,898,291 A * | 4/1999 | Hall ..................... | H02J 7/0029 320/121 |
| 6,909,216 B2 * | 6/2005 | Kadoya ..................... | B60K 6/26 310/180 |
| 8,314,578 B2 * | 11/2012 | Namuduri ............... | B60L 58/20 318/700 |
| 8,497,687 B2 * | 7/2013 | Bauer ..................... | B60L 50/16 363/55 |
| 10,054,642 B2 * | 8/2018 | Mizobe ............. | H02J 7/007182 |
| 10,086,705 B2 * | 10/2018 | Chow ..................... | B60L 58/18 |
| 10,703,210 B2 * | 7/2020 | Kees ........................ | B60L 1/00 |
| 10,974,616 B2 * | 4/2021 | Wang ..................... | B60L 58/20 180/65.285 |
| 2007/0029124 A1 * | 2/2007 | DasGupta ............. | B60L 3/0046 429/218.1 |
| 2008/0103707 A1 * | 5/2008 | Iwasaki ................... | H02J 7/005 702/58 |

(Continued)

FOREIGN PATENT DOCUMENTS

WO WO-2016029202 A1 * 2/2016 ............ H01M 10/44
WO WO-2017114802 A1 * 7/2017 ............ H02J 7/0047

OTHER PUBLICATIONS

Pesaran et al., "Thermal characteristics of selected EV and HEV batteries" Sixteenth Annual Battery Conference on Applications and Advances. Proceedings of the Conference (Cat. No. 01TH8533). IEEE, (Jan. 2001) pp. 219-225.

*Primary Examiner* — M Baye Diao (74) *Attorney, Agent, or Firm* — Cantor Colburn LLP (57) ABSTRACT

A battery electric vehicle includes a high voltage rechargeable energy storage system (RESS). The RESS includes several battery modules reconfigurable among parallel and series arrangements. During reconfiguration transitions, a low voltage battery services low voltage loads of the battery electric vehicle. The low voltage battery is preconditioned in advance of reconfigurations.

19 Claims, 3 Drawing Sheets

(56) References Cited

U.S. PATENT DOCUMENTS

| | | | |
|---|---|---|---|
| 2009/0033282 A1* | 2/2009 | Ishikawa | H02J 7/0018 |
| | | | 320/122 |
| 2010/0305792 A1* | 12/2010 | Wilk | B60L 50/61 |
| | | | 701/22 |
| 2012/0032506 A1* | 2/2012 | Cawthorne | F02N 11/0866 |
| | | | 307/10.6 |
| 2013/0221878 A1* | 8/2013 | Feuerstack | B60L 58/18 |
| | | | 318/139 |
| 2014/0012446 A1* | 1/2014 | Kumar | B60L 53/00 |
| | | | 701/22 |
| 2014/0368041 A1* | 12/2014 | Tu | B60L 7/14 |
| | | | 307/52 |
| 2017/0368941 A1* | 12/2017 | Chow | H02J 9/061 |
| 2019/0359067 A1 | 11/2019 | Hu et al. | |
| 2021/0249872 A1* | 8/2021 | Fritz | H02J 7/0031 |
| 2021/0300208 A1* | 9/2021 | Fritz | H02M 3/335 |

* cited by examiner

FIG. 1

|  | | DC Battery Temp./Condition | | | |
|---|---|---|---|---|---|
| LV Load (W) | Current(A) | (V) Hot/New | (V) Cold/New | (V) Hot/Old | (V) Cold/Old |
| 0 | 0 | 12.4 | 11.4 | 12.4 | 11.4 |
| 500 | 38 | 12.3 | 11.2 | 12.0 | 10.8 |
| 1000 | 77 | 12.2 | 11.0 | 11.7 | 10.2 |
| 1500 | 115 | 12.0 | 10.8 | 11.4 | 9.7 |
| 2000 | 154 | 11.9 | 10.6 | 11.0 | 9.1 |
| 2500 | 192 | 11.8 | 10.4 | 10.7 | 8.5 |
| 3000 | 231 | 11.7 | 10.2 | 10.3 | 7.9 |
| 3500 | 269 | 11.6 | 10.0 | 10.0 | 7.4 |
| 4000 | 308 | 11.5 | 9.9 | 9.6 | 6.8 |
| 4500 | 346 | 11.4 | 9.7 | 9.3 | 6.2 |
| 5000 | 385 | 11.2 | 9.5 | 8.9 | 5.7 |

BATTERY ELECTRIC VEHICLE ENERGY STORAGE SYSTEM AND METHOD

INTRODUCTION

A battery electric vehicle (BEV) may include a rechargeable energy storage system (RESS) including at least one high voltage (HV) DC battery module, for example at about 400 volts nominal terminal voltage. RESSs may include multiple DC battery modules. Multiple HV DC battery modules may be configured in parallel during vehicle propulsion periods. Multiple HV DC battery modules may be configured in series during recharging periods. HV DC battery modules primarily service vehicle propulsion system components such as traction motors. Certain high-power vehicle accessory loads, for example electrically driven air conditioning compressors or vehicle cabin heaters, may be serviced by HV DC battery modules.

BEVs may include at least one low voltage (LV) DC auxiliary battery, for example about 12 volts nominal terminal voltage. A LV DC auxiliary battery may service vehicle loads at voltages substantially below the voltage of the HV DC battery modules. Such vehicle loads may include, for example, vehicle lighting, infotainment, accessory motors, resistive or PTC heating loads such as glass defroster/deicer or seat heaters, and control electronics.

SUMMARY

In one exemplary embodiment, a method for reconfiguring an energy storage system having a plurality of HV DC battery modules may include preconditioning a LV DC auxiliary battery including establishing at least one predetermined battery parameter to a respective target, isolating the LV DC auxiliary battery from all HV DC battery modules during a reconfiguration of the energy storage system, and electrically servicing a predetermined electrical load with the LV DC battery during the reconfiguration of the energy storage system.

In addition to one or more of the features described herein, reconfiguration of the energy storage system may include establishing a series arrangement of HV DC battery modules.

In addition to one or more of the features described herein, reconfiguration of the energy storage system may include establishing a parallel arrangement of HV DC battery modules.

In addition to one or more of the features described herein, reconfiguration of the energy storage system may include isolating the LV DC auxiliary battery from one of the HV DC battery modules and subsequently coupling the LV DC auxiliary battery to another of the HV DC battery modules.

In addition to one or more of the features described herein, the at least one predetermined battery parameter may include battery temperature.

In addition to one or more of the features described herein, the at least one predetermined battery parameter may include battery state of charge.

In addition to one or more of the features described herein, preconditioning the LV DC auxiliary battery may include running current through the LV DC auxiliary battery.

In another exemplary embodiment, a method for operating an energy storage system having a plurality of HV DC battery modules may include executing a direct current recharge routine for a rechargeable battery energy storage system, the recharge routine including selectively reconfiguring the rechargeable battery energy storage system from among a plurality of configurations during the recharge routine. In advance of an incipient reconfiguration of the rechargeable battery energy storage system, current may be flowed through a LV DC auxiliary battery to establish a predetermined state of discharge readiness of the LV DC auxiliary battery. During any reconfiguration of the rechargeable battery energy storage system, the LV DC auxiliary battery may be isolated from all HV DC battery modules and electrically service a predetermined electrical load.

In addition to one or more of the features described herein, the plurality of configurations during the recharge routine may include a series arrangement of HV DC battery modules and a parallel arrangement of HV DC battery modules. Reconfiguring the rechargeable battery energy storage system may include transitioning from one of the parallel and series arrangements of HV DC battery modules to the other of the parallel and series arrangements of HV DC battery modules.

In addition to one or more of the features described herein, the plurality of configurations during the recharge routine may include a series arrangement of HV DC battery modules and a parallel arrangement of HV DC battery modules. Reconfiguring the rechargeable battery energy storage system may include decoupling the LV DC auxiliary battery from one of the HV DC battery modules to another of the HV DC battery modules while the HV DC battery modules remain in the series arrangement.

In addition to one or more of the features described herein, flowing current through a LV DC auxiliary battery to establish a predetermined state of discharge readiness of the LV DC auxiliary battery may include alternating between charge and discharge current through the LV DC auxiliary battery.

In addition to one or more of the features described herein, the discharge current through the LV DC battery may include discharge current servicing a vehicle accessory load.

In addition to one or more of the features described herein, the discharge current through the LV DC battery may include discharge current servicing at least one of the HV DC battery modules.

In yet another exemplary embodiment, a battery electric vehicle may include a controller, a rechargeable propulsion battery energy storage system including a plurality of HV DC battery modules having a first nominal terminal voltage, a rechargeable LV DC auxiliary battery having a second nominal terminal voltage, a DC-DC converter, a battery disconnect module including a plurality of selectively controllable switches configurable in response to control signals from the controller to selectively transition the rechargeable HV battery energy storage system among a plurality of configurations comprising a series arrangement of HV DC battery modules, a parallel arrangement of HV DC battery modules, a coupled arrangement between HV DC battery modules and the rechargeable LV DC auxiliary battery through the DC-DC converter, and a decoupled arrangement between HV DC battery modules and the rechargeable LV DC auxiliary battery. The controller may be configured to flow current through the rechargeable LV DC auxiliary battery to establish a predetermined state of discharge readiness of the rechargeable LV DC auxiliary battery in advance of any transition of the rechargeable HV battery energy storage system among the plurality of configurations, establish the decoupled arrangement between HV DC battery modules and the rechargeable LV DC auxiliary battery during any transition of the rechargeable HV battery energy storage system among the plurality of configurations, and establish the coupled arrangement between HV DC battery modules and the rechargeable LV DC auxiliary battery through the DC-DC converter between transitions of the rechargeable HV battery energy storage system among the plurality of configurations.

In addition to one or more of the features described herein, the rechargeable LV DC auxiliary battery services an electrical load during transitions of the rechargeable HV battery energy storage system among the plurality of configurations.

In addition to one or more of the features described herein, the controller may be configured to flow current through the rechargeable LV DC auxiliary battery to establish a predetermined state of discharge readiness of the rechargeable LV DC auxiliary battery in advance of transitions of the rechargeable HV battery energy storage system among the plurality of configurations may include alternating between charge and discharge current through the rechargeable LV DC auxiliary battery.

In addition to one or more of the features described herein, alternating between charge and discharge current through the rechargeable LV DC auxiliary battery may include discharge current through the rechargeable LV DC auxiliary battery servicing a vehicle accessory load.

In addition to one or more of the features described herein, alternating between charge and discharge current through the rechargeable LV DC auxiliary battery may include discharge current through the rechargeable LV DC auxiliary battery servicing at least one of the HV DC battery modules.

In addition to one or more of the features described herein, selectively transitioning the rechargeable HV battery energy storage system among a plurality of configurations may include transitioning from one of the parallel and series arrangements of HV DC battery modules to the other of the parallel and series arrangements of HV DC battery modules.

In addition to one or more of the features described herein, selectively transitioning the rechargeable HV battery energy storage system among a plurality of configurations may include decoupling the rechargeable LV DC auxiliary battery from one of the HV DC battery modules to another of the HV DC battery modules while the HV DC battery modules remain in the series arrangement.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
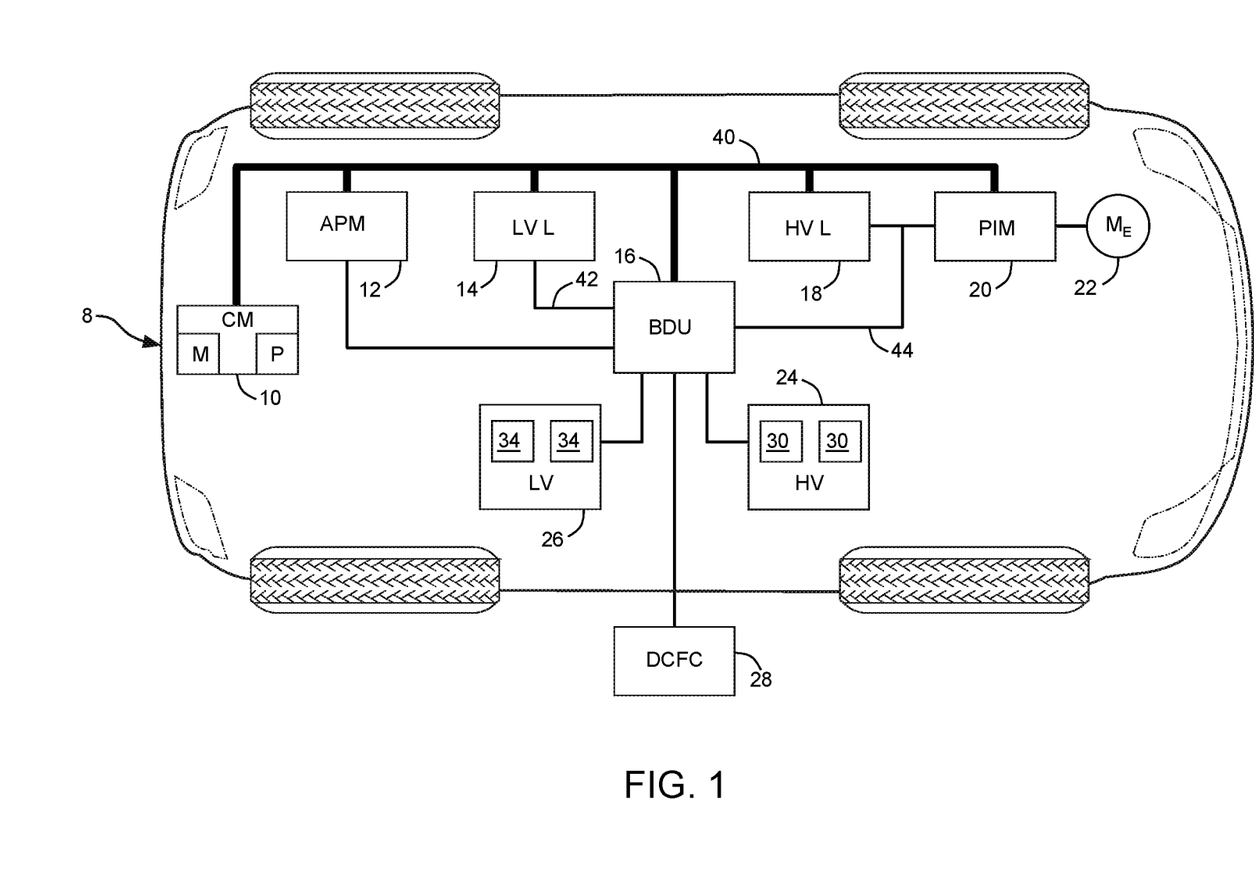
FIG. 1 illustrates an exemplary battery electric vehicle, in accordance with the present disclosure.

Referring to FIG. 1, an exemplary battery electric vehicle (BEV) 8 has a control system which may include at least one control module (CM) 10 which may be one of a plurality of networked control modules and other network nodes including sensors, actuators, and other smart components, all of which may be communicatively coupled via a bus structure 40 to perform control functions and information sharing, including executing control routines locally or in distributed fashion. Bus structure 40 therefore may include such other nodes as auxiliary power module (APM) 12, low voltage loads 14, battery disconnect unit (BDU) 16, high voltage loads 18, and power inverter module (PIM) 20, all of which are discussed in further detail herein. Control module 10 may include a processor P and non-transitory memory M. Bus structure 40 may be a part of a Controller Area Network (CAN), or other similar network, as well known to those having ordinary skill in the art. One exemplary control module may include a propulsion system control module primarily performing functions related BEV powertrain functions, including controlling wheel torque and electric charging. One having ordinary skill in the art recognizes that a plurality of other control modules may be part of the network of controllers onboard the BEV 8 and may perform other functions related to various other vehicle systems (e.g. chassis, steering, braking, communications, infotainment, etc.).

BEV 8 may include a high voltage rechargeable energy storage system (HV RESS) 24. HV RESS 24 may include several HV DC battery modules 30. All HV DC battery modules 30 may have equivalent design terminal voltages, for example nominally 400 volts. During vehicle propulsion operation, the HV DC battery modules 30 may be configured in parallel to provide the HV terminal voltage to a high voltage bus 44. The number of HV DC battery modules 30 may be application specific; however, it should be appreciated that at least two HV DC battery modules 30 will allow for reconfiguration of the at least two HV DC battery modules 30 in series to enable DC fast charging of the HV DC battery modules 30 at substantially twice the nominal terminal voltage, for example nominally 800 volts, across the series arrangement via off-board DC fast charge (DCFC) station 28. DCFC station 28 may also provide DC charging at HV DC battery modules 30 design terminal voltages, for example nominally 400 volts. DCFC station 28 is manually coupled to BEV 8 via a charging port (not separately illustrated).

High voltage bus (HV bus) 44 provides high voltage DC, for example 400 volts, to service high voltage loads 18, including BEV 8 cabin heaters and BEV electrically driven air conditioning compressors. High voltage bus 44 also provides high voltage DC to one or more PIMs 20 to provide multi-phase alternating current electric power to respective electric traction motors ($M_E$) 22.

BEV 8 may include a low voltage rechargeable energy storage system (LV RESS) 26. LV RESS 26 may include several LV DC auxiliary batteries 34. All LV DC auxiliary batteries 34 may have equivalent design terminal voltages, for example nominally 12 volts. During vehicle propulsion operation, the LV DC auxiliary batteries 34 may be configured in parallel to provide the LV terminal voltage to a low voltage bus 42. The number of LV DC auxiliary batteries 34 may be application specific; however, it should be appreciated that at least one LV DC auxiliary battery 34 will enable certain basic functions as set forth herein. Various additional functions set forth herein are enabled with several such LV DC auxiliary batteries 34.

Low voltage bus (LV bus) 42 provides low voltage DC, for example 12 volts, to service low voltage loads 14, including BEV 8 lighting, infotainment, accessory motors, resistive or PTC heating loads such as glass defroster/deicer or seat heaters, and control electronics.

BDU 16 may include a plurality of independently controllable mechanical switches or solid-state switches (contactors) for opening and closing various electrical paths effective to controllably couple and decouple electrical components and circuits, and to do so with controlled timing or sequencing to effect various reconfigurations of and among the electrical components and circuits. BDU 16 may be controlled to selectively isolate LV RESS 26, HV RESS 24, LV bus 42, HV bus 44, DCFC 28, and APM 12 one from another. BDU 16 may be controlled to isolate individual HV DC battery modules 30 of HV RESS 24 or isolate individual LV DC auxiliary batteries 34 of LV RESS 26. BDU 16 may be controlled to configure some or all HV DC battery modules 30 of HV RESS 24 into a parallel configuration, or some or all HV DC battery modules 30 of HV RESS 24 into a series configuration. Likewise, BDU 16 may be controlled to configure some or all LV DC auxiliary batteries 34 of LV RESS 26 into a parallel configuration, or some or all LV DC auxiliary batteries 34 of LV RESS 26 into a series configuration. BDU 16 may be controlled to couple LV RESS 26 individual LV DC auxiliary batteries 34 or parallel and series combinations thereof via APM 12 to HV RESS 24 individual HV DC battery modules 30 or parallel and series combinations thereof. BDU 16 may be controlled to couple LV RESS 26 individual LV DC auxiliary batteries 34 one to another via APM 12. BDU 16 may be controlled to couple DCFC 28 to HV RESS 24 individual HV DC battery modules 30 or parallel and series combinations thereof. BDU 16 is illustrated in FIG. 1 as a separate functional block in the diagram; however, in application, contactors of BDU 16 may be integrated into one or more controllable units, or physically and functionally distributed variously within components or subsystems, for example within HV or LV RESSs 24,26 hardware packaging or associated with individual HV DC battery modules 30 or LV DC auxiliary batteries 34.

APM 12 may be a DC-DC converter functional to step-down HV DC battery module 30 design terminal voltage, for example nominally 400 volts, to LV DC auxiliary battery 34 design terminal voltage, for example nominally 12 volts. APM 12 may be a bi-directional DC-DC converter additionally functional to step-up LV DC auxiliary battery 34 design terminal voltage, for example nominally 12 volts, to HV DC battery module 30 design terminal voltage, for example nominally 400 volts. Moreover, APM 12 may be a DC-DC converter additionally functional to shuttle charge between LV DC auxiliary batteries 34. It is appreciated that APM 12 may controllably provide isolation of the LV RESS 26/LV bus 42 from the HV RESS 24/HV bus 44.

During periods of BEV 8 operation wherein the vehicle is not coupled to the DCFC station 28, the HV DC battery modules 30 may be configured in parallel and coupled to the HV bus 44 by the BDU 16. During a recharge of the HV RESS 24, the HV DC battery modules 30 of the HV RESS 24 may be configured in series. For example, in a system capable of DCFC at substantially twice the nominal terminal voltage of a single HV DC battery module 30, and further in a system having a HV RESS 24 including only two HV DC battery modules 30, the charging routine may configure the two HV DC battery modules 30 in series for a majority of the time of charge. In a system having three HV DC battery modules 30, and wherein the DCFC capability is limited to substantially twice the nominal terminal voltage of a single HV DC battery module 30, the charging routine may configure two of three HV DC battery modules 30 in series for periods with the third at rest with rotation of each HV DC battery module 30 into and out of a series configuration. In a system having four HV DC battery modules 30, the charging routine may configure pairs of the HV DC battery modules 30 in series with rotation of each pair of series configured HV DC battery modules 30 into and out of active charging. It will be appreciated that, with any even number of HV DC battery modules 30, multiple series configured pairs of HV DC battery modules 30 may themselves by configured in parallel to be charged at substantially twice the nominal terminal voltage of a single HV DC battery module 30. It further will be appreciated that, with any odd number of HV DC battery modules 30, multiple series configured pairs of HV DC battery modules 30 may themselves by configured in parallel to be charged at substantially twice the nominal terminal voltage of a single HV DC battery module 30 with the remaining unpaired HV DC battery modules 30 at rest with rotation of each HV DC battery module 30 into and out of a series configuration. Such handling of HV DC battery modules 30 can be extrapolated to DCFC capabilities of multiples of the nominal terminal voltage of the HV DC battery modules 30, with series configurations of HV DC battery modules 30 in accordance with the multiple. Charge routines may also include periodic parallel configurations of the HV DC battery modules 30, for example to accomplish charge balancing objectives. Also, during DCFC wherein HV DC battery modules 30 may be configured in series, the APM 12 may couple across one of the HV DC battery modules 30 to service the DC requirements of the LV bus 42 including LV loads 14. In order to better maintain charge balance between the series configured HV DC battery modules 30, the APM 12 may periodically be reconfigured across different ones of the HV DC battery modules 30 during such charge routines.

Regardless of the details of the charging routine, it is recognized that periodic changes to the configurations of the HV DC battery modules 30 and APM may occur. Such reconfigurations may require temporary but significant transition times wherein the APM or LV DC auxiliary battery 34 of the LV RESS 26 is isolated or decoupled from any HV DC battery module 30. Thus, during these transitions, the LV DC auxiliary battery 34 must service the LV bus 42 loads 14 ordinarily handled by the APM. Since control modules are loads upon the LV bus 42, including control module 10 managing RESS controls including charge routines and reconfiguration controls, it is desirable that the LV DC auxiliary battery 34 is capable of servicing the LV loads 14 through such reconfiguration transitions.

Figure 2:
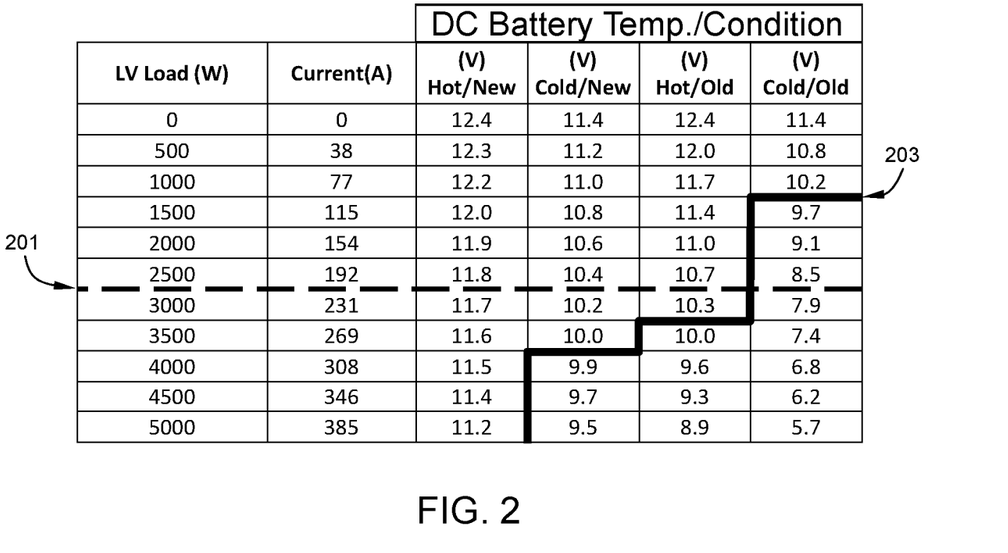
FIG. 2 shows a mapping of battery terminal voltages for an exemplary 12-volt lead-acid battery at various load and temperature/condition combinations, in accordance with the present disclosure.

FIG. 2 shows a mapping of battery terminal voltages for an exemplary 12-volt lead-acid battery at various load and temperature/condition combinations. FIG. 2 is merely representative of certain exemplary conditions useful in illustrating certain utility and benefits in accordance with the present disclosure. For example, battery temperature labeled hot may correspond to a minimum target temperature preferred for battery performance, whereas battery temperature labeled cold may correspond to minimum temperature conditions that may be encountered in use. Likewise, battery age labeled new may correspond to a fresh, uncycled battery, whereas battery age labeled old may correspond to a battery near the end of its useful life as determined by, for example, at 80% of its original capacity. It is known, for example, that a typical lead-acid battery may provide substantially 100% of available capacity at 30° C., whereas the same lead-acid battery may provide substantially 50% of available capacity at −30° C. at moderate discharge rates. Additionally, battery terminal voltage is known to drop as temperature drops. Very low temperatures may result in unacceptably low terminal voltage. Battery age or cycles is also known to affect battery performance due to corrosion, shedding, and sulfation among other mechanisms. Thus, older batteries may also exhibit lower terminal voltages than their newer counterparts. These trends are appreciated in the mapping of battery terminal voltages in FIG. 2.

A lead-acid battery may be considered adequate for use in servicing LV loads in accordance with the present disclosure when its terminal voltage is above substantially 10 volts for example. Thus, from the mapping of battery terminal voltages in FIG. 2, it can be appreciated that line 203 distinguishes acceptable terminal voltage above the line and unacceptable terminal voltages below the line. Low voltage loads that correspond to terminal voltages above the line 203 are thus considered as serviceable by a battery at the corresponding temperature/condition combinations, whereas low voltage loads that correspond to terminal voltages below the line 203 are thus considered as not serviceable by a battery at the corresponding temperature/condition combinations. Line 201 generally delineates a maximum peak LV load during reconfiguration transitions. Such maximum serviceable peak LV load may be arbitrary or may be a designed maximum allowed by the control system, for example by active load management during reconfiguration transitions. Regardless, it is intended to represent actual anticipated LV loads of the BEV and not an arbitrarily attenuated load. It is appreciated that the maximum peak LV load 201 may be adequately serviced by all battery temperature/condition combinations excepting the cold/old combination. Thus, it can be appreciated that through temperature manipulation of the battery, even an old battery may be conditioned to adequately service LV loads during reconfiguration transitions in accordance with the present disclosure.

Therefore, it may be desirable to precondition at least one of the LV DC auxiliary batteries 34 of the LV RESS 26 prior to reconfiguration transitions to ensure that LV loads 14 may be adequately serviced solely by the LV RESS 26 during such reconfiguration transitions. Further references herein with respect to preconditioning will be with respect to a singular LV DC auxiliary battery 34 though one skilled in the art will appreciate that multiple such LV DC auxiliary batteries 34 may be similarly preconditioned in accordance with the particular application in accordance with the present disclosure. While temperature is a metric utilized herein correlated to the LV RESS 26 capability to adequately service the LV loads 14 reconfiguration transitions, other metrics may be similarly correlated. Moreover, additional parameters may be useful in the preconditioning of the LV DC auxiliary battery 34 of LV RESS 26, for example state of charge (SOC). Preconditioning of the LV DC auxiliary battery 34 of the LV RESS 26 therefore may include one or more of ensuring a minimum temperature condition and ensuring a minimum SOC to establish a predetermined state of discharge readiness in anticipation of an incipient reconfiguration transition.

Preconditioning of the LV DC auxiliary battery 34 of the LV RESS 26 preferably includes running current through the LVDC battery 34. LV DC auxiliary battery 34 internal resistance may therefore provide a convenient mechanism for resistance heating of the LV DC auxiliary battery 34. A typical lead-acid battery may have a heat capacity of substantially 500 to 700 J/kg/° C. and an internal resistance of substantially 5 to 50 mΩ. An exemplary increase in temperature from about −30° C. to 0° C. in a 15 Ah battery (substantially 6 kg) requires about 90 kJ to about 12.6 kJ of energy. A current of substantially 192 amperes would provide substantially about 185 to about 1850 watts of power and a heating time of substantially about 6 to about 60 seconds.

Generally, discharge current may be preferable to charge currents since charge currents may be more limited in magnitude before resulting in unacceptable high terminal voltages and associated deleterious site reactions internal to the battery. However, it is appreciated that discharge currents alone may result in a battery SOC that is undesirably low, which may result in battery capacity insufficient to service the LV loads 14 for the reconfiguration transition period or battery damaging deep discharge levels. Thus, it is appreciated that both discharge and charge currents may be run through the battery to effect a temperature target and a SOC target for the LV DC auxiliary battery 34. Discharge currents may be dissipated through LV loads 14, such as those previously set forth herein. Such discharges may be preferential where the functions effected by such loads are desired. For example, it may be desirable during a DCFC that the vehicle seats be heated or the vehicle glass be heated to defrost/deice. However, it is appreciated that dissipating currents may represent wasted energy. Thus, it is further appreciated that discharge currents run though a LV DC auxiliary battery 34 may be recaptured into the HV DC battery modules 30 of the HV RESS 24, into other LV DC auxiliary batteries 34 of the LV RESS 26, or into other electrical storage devices such as capacitors.

Figure 3:
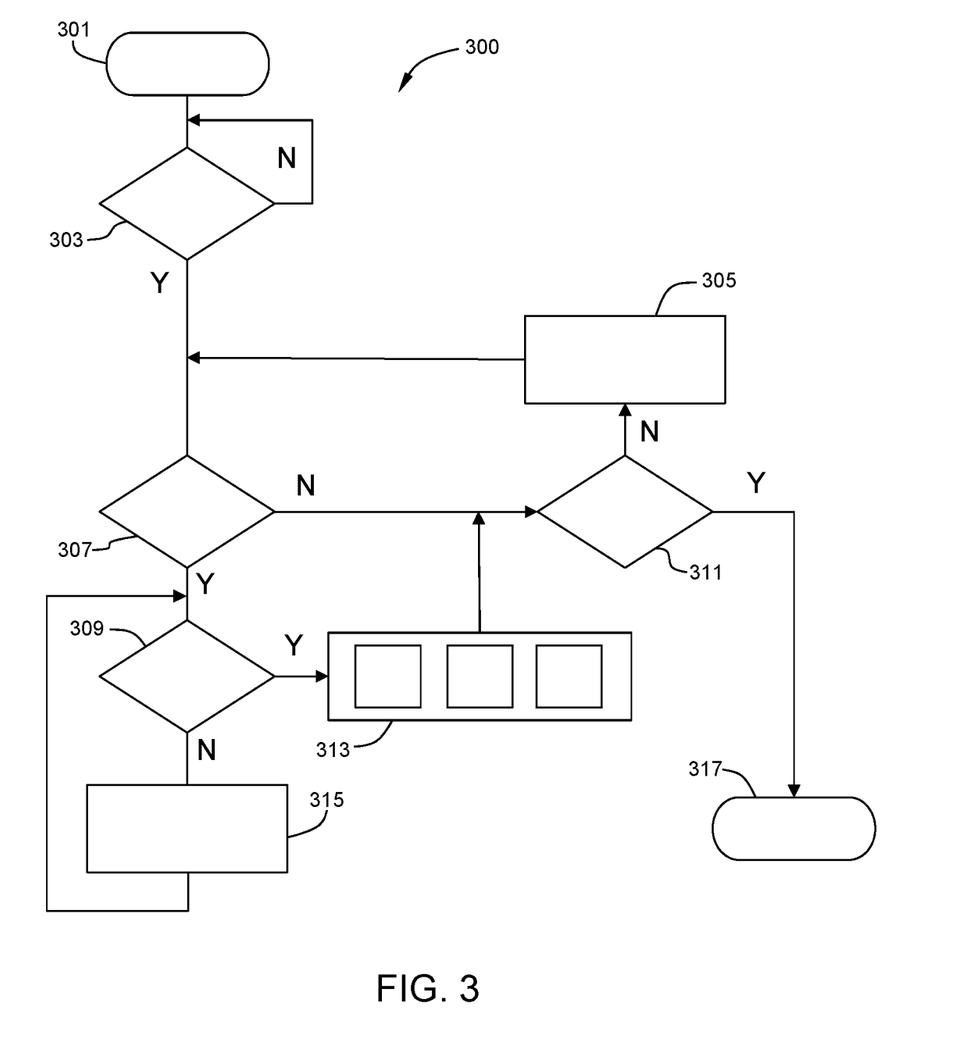
FIG. 3 shows an exemplary charge routine, in accordance with the present disclosure.

FIG. 3 shows exemplary charge routine 300 for the HV RESS 24 of the BEV 8. The routine may represent instruction sets stored in non-transitory memory and executed by the processor of control module 10 in FIG. 1. The routine 300 starts at 301. At 303 a determination is made whether a charging is to be implemented. For example, determinations of charging conditions including successful charge port connections to a charge station 28 and operator or automated approvals may be made. Once charging is allowed, 307 determines whether a reconfiguration of the HV RESS 24 is to be made. For example, if a DCFC is available via the charge station 28, an initial reconfiguration of HV DC battery modules 30 from parallel to series may be desirable. Where a reconfiguration is desirable, 309 determines whether the LV RESS 26 is ready. In other words, is the LV DC auxiliary battery 34 in an acceptable state of discharge readiness to service the anticipated LV loads during the desired reconfiguration transition? This may include temperature, SOC and other determinations as previously discussed herein. Where the LV DC auxiliary battery 34 is not in an acceptable state of discharge readiness, 315 implements steps to precondition the LV DC auxiliary battery 34, including, for example, running current through the LV DC auxiliary battery 34 to effect temperature change and SOC change. From here, the LV RESS 26 readiness is reevaluated at 309 and the procedure of readiness determinations 309 and preconditioning 315 is repeated until readiness is determined. Where the LV DC auxiliary battery 34 is in an acceptable state of discharge readiness as determined at 309, reconfiguration of the HV RESS 24 is effected at 313. Reconfiguration at 313 may include a number of sub-steps and functions including, for example, decoupling or isolating the LV RESS 26 and servicing LV loads from the LV DC auxiliary battery 34, decoupling or isolating the HV RESS 24, reconfiguring the HV DC battery modules 30 from among a plurality of configurations as previously discussed herein, and reconfiguring the APM coupling among ones of series connected HV DC battery modules 30. Subsequent to reconfiguration at 313, a determination is made whether the charge is complete at 311. If the charge is complete, the routine is exited at 317. Where the charge is not complete, the charging continues at 305 in accordance with the charging control. Continued charging at 305 revisits the decisions at 307 whether a reconfiguration is required. During active recharging, the decisions at 307 may additionally include, for example, determinations of whether to reconfigure the APM to couple to an alternate HV DC battery module 30, determinations whether to reconfigure for reasons of charge balancing, and determinations whether to reconfigure HV DC battery modules 30 into parallel arrangements for ending the charge routine. Subsequent to a final reconfiguration in advance of ending the charge routine or during ongoing recharge within a configuration, decisions at 307 passes to 311 to determine whether the charge routine continues 305 or ends 317.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for reconfiguring a high voltage (HV) rechargeable energy storage system (RESS) having a plurality of HV DC battery modules, a HV bus and an auxiliary power module (APM) selectively couplable between HV DC battery modules and a low voltage (LV) DC auxiliary battery of a LV RESS, comprising:
   prior to a reconfiguration of the HV RESS, preconditioning the LV DC auxiliary battery to a predetermined state of discharge readiness sufficient to solely service LV electrical loads on a LV bus, comprising establishing at least one predetermined battery parameter to a respective target;
   isolating with the APM the LV RESS and the LV bus from the HV RESS and the HV bus during a reconfiguration of the HV RESS; and
   electrically servicing the LV electrical loads on the LV bus with the LV DC auxiliary battery during the reconfiguration of the HV RESS.

2. The method of claim 1, wherein reconfiguration of the HV RESS comprises establishing a series arrangement of HV DC battery modules.

3. The method of claim 1, wherein reconfiguration of the HV RESS comprises establishing a parallel arrangement of HV DC battery modules.

4. The method of claim 1, wherein reconfiguration of the HV RESS comprises isolating the LV DC auxiliary battery from one of the HV DC battery modules and subsequently coupling the LV DC auxiliary battery to another of the HV DC battery modules.

5. The method of claim 1, wherein the at least one predetermined battery parameter comprises battery temperature.

6. The method of claim 1, wherein the at least one predetermined battery parameter comprises battery state of charge.

7. The method of claim 1, wherein preconditioning the LV DC auxiliary battery comprises running current through the LV DC auxiliary battery.

8. A method for operating an energy storage system having a plurality of high voltage (HV) DC battery modules and an auxiliary power module (APM) selectively couplable between HV DC battery modules and a low voltage (LV) DC auxiliary battery, comprising:
   executing a direct current recharge routine for a rechargeable battery energy storage system, the recharge routine comprising selectively reconfiguring the rechargeable battery energy storage system from among a plurality of configurations during the recharge routine;

in advance of an incipient reconfiguration of the rechargeable battery energy storage system, flowing current through the LV DC auxiliary battery to establish a predetermined state of discharge readiness of the LV DC auxiliary battery; and during any reconfiguration of the rechargeable battery energy storage system, isolating with the APM the LV DC auxiliary battery from all HV DC battery modules and electrically servicing a predetermined electrical load with the LV DC auxiliary battery.

9. The method of claim 8, wherein the plurality of configurations during the recharge routine comprises a series arrangement of HV DC battery modules and a parallel arrangement of HV DC battery modules, and wherein reconfiguring the rechargeable battery energy storage system comprises transitioning from one of the parallel and series arrangements of HV DC battery modules to the other of the parallel and series arrangements of HV DC battery modules.

10. The method of claim 8, wherein the plurality of configurations during the recharge routine comprises a series arrangement of HV DC battery modules and a parallel arrangement of HV DC battery modules, and wherein reconfiguring the rechargeable battery energy storage system comprises decoupling the LV DC auxiliary battery from one of the HV DC battery modules to another of the HV DC battery modules while the HV DC battery modules remain in the series arrangement.

11. The method of claim 8, wherein flowing current through a LV DC auxiliary battery to establish a predetermined state of discharge readiness of the LV DC auxiliary battery comprises alternating between charge and discharge current through the LV DC auxiliary battery.

12. The method of claim 11, wherein the discharge current through the LV DC auxiliary battery comprises discharge current servicing a vehicle accessory load.

13. The method of claim 11, wherein the discharge current through the LV DC auxiliary battery comprises discharge current servicing at least one of the HV DC battery modules.

14. A battery electric vehicle, comprising:
a controller;
an energy storage system having a plurality of high voltage (HV) DC battery modules and an auxiliary power module (APM) selectively couplable between HV DC battery modules and a low voltage (LV) DC auxiliary battery;

the controller configured to:
execute a direct current recharge routine for a rechargeable battery energy storage system, the recharge routine comprising selectively reconfiguring the rechargeable battery energy storage system from among a plurality of configurations during the recharge routine;

in advance of an incipient reconfiguration of the rechargeable battery energy storage system, flow current through the LV DC auxiliary battery to establish a predetermined state of discharge readiness of the LV DC auxiliary battery; and during any reconfiguration of the rechargeable battery energy storage system, isolate with the APM the LV DC auxiliary battery from all HV DC battery modules and electrically service a predetermined electrical load with the LV DC auxiliary battery.

15. The battery electric vehicle of claim 14, wherein the controller configured to flow current through the LV DC auxiliary battery to establish a predetermined state of discharge readiness of the LV DC auxiliary battery comprises alternating between charge and discharge current through the rechargeable LV DC auxiliary battery.

16. The battery electric vehicle of claim 15, wherein alternating between charge and discharge current through the LV DC auxiliary battery comprises discharge current through the LV DC auxiliary battery servicing a vehicle accessory load.

17. The battery electric vehicle of claim 15, wherein alternating between charge and discharge current through the LV DC auxiliary battery comprises discharge current through the LV DC auxiliary battery servicing at least one of the HV DC battery modules.

18. The battery electric vehicle of claim 14, wherein selectively reconfiguring the rechargeable battery energy storage system from among a plurality of configurations comprises transitioning from one of parallel and series arrangements of HV DC battery modules to the other of the parallel and series arrangements of HV DC battery modules.

19. The battery electric vehicle of claim 14, wherein selectively reconfiguring the rechargeable battery energy storage system from among a plurality of configurations comprises decoupling the LV DC auxiliary battery from one of the HV DC battery modules to another of the HV DC battery modules while the HV DC battery modules remain in a series arrangement.

\* \* \* \* \*